Patented Mar. 13, 1945

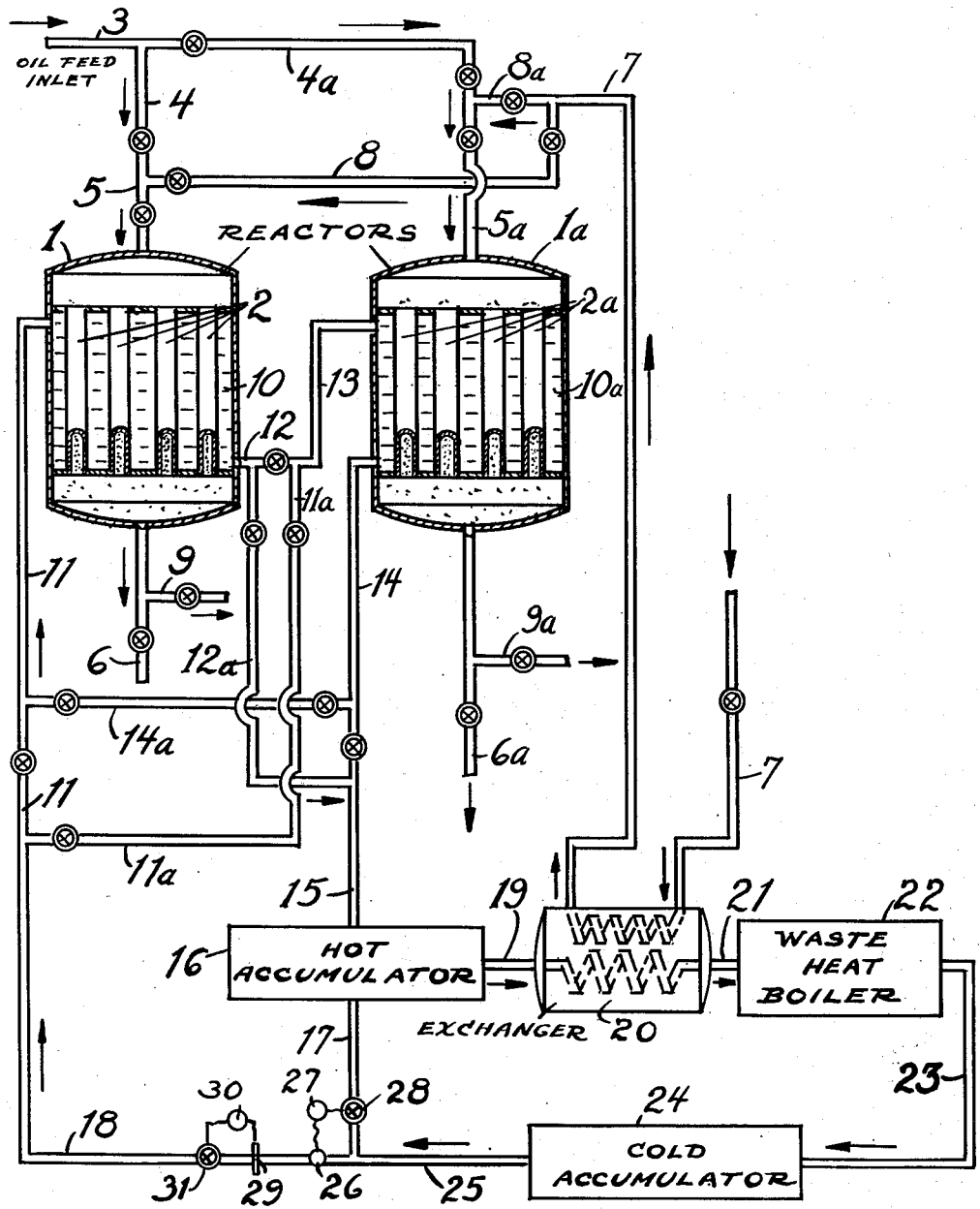

2,371,381

UNITED STATES PATENT OFFICE 2,371,381

HEAT EXCHANGE IN CHEMICAL PROCESSES

Donald L. Campbell, Short Hills, and Homer Z. Martin, Roselle, N. J., assignors to Standard Oil Development Company, a corporation of Delaware Application February 16, 1943, Serial No. 476,038

5 Claims. (Cl. 23—1)

The present invention relates to the temperature control of reaction zones in which endothermic or exothermic reactions take place. These zones may or may not contain a catalyst which promotes, enters into, or in any other way assists the reaction. More particularly, this invention relates to the passage of a stream of heating or cooling fluid in heat exchange relation with the reaction zone and is directed particularly towards circuits for handling the heat exchange fluid used in controlling the temperature of these reaction zones wherein the rate or intensity of reaction fluctuates.

For illustration, one concrete embodiment of this invention is shown in the somewhat diagrammatic flow chart comprising the single view of the accompanying drawing.

In processes involving the treatment of organic compounds, such as petroleum hydrocarbons, by passing them usually preheated in vapor phase at temperatures between 800° and 1000° F. thru a catalyst in order to crack, reform, hydroform, polymerize, or otherwise refine them or to transform them into other compounds, it is necessary to control the temperature of reaction within close limits. These operations are characterized by the deposition of carbonaceous materials on the surface of the catalyst which is gradually reduced in activity. It therefore becomes necessary to regenerate the catalyst. This regeneration may be accomplished by contacting the catalyst with air or other oxygen-carrying fluid so as to burn off the accumulated deposits. The temperature in this operation varies between 900° and 1100° F.

It is known to control the temperature of such catalytic reactions by the circulation in heat exchange relation with the catalyst and the compounds passing therethrough of heat transfer media at such temperature and at such rates as to maintain the temperature of reaction within the desired range. In the case of exothermic reactions, such as exemplified by the regeneration of the catalyst, these heat exchange media are capable of absorbing the excess heat without cooling the reaction chamber below the desired reaction temperature, and corresponding use can be made in endothermic reactions. When only an exothermic reaction is involved or when the net heat added to the medium by the exothermic reaction is greater than that removed by the endothermic reaction, the heat transfer medium must be cooled at some point in its circuit and it is usual in the economic practice of any such catalytic process to utilize the net heat available in the most efficient manner possible, such as, for instance, the generation of steam.

Endothermic or exothermic chemical reactions are subject to momentary or progressive changes of considerable magnitude, in velocity, completeness or intensity with changes in operating conditions, including the concentration of reactants, space velocity, pressure, and condition of any catalyst which may be disposed in the reaction zone. When a catalyst promotes a reaction in which carbonaceous materials are deposited as a contaminant thereon and the catalyst is reduced in activity, the intensity of the reaction progressively changes during the course of the reaction period and consequently the rate at which heat is removed from these reactors by a heat exchange medium is correspondingly variable. However, it is eminently desirable to maintain the temperature and the rate of heat transfer medium returning to the reactors as constant as possible in order to avoid cooling the catalyst and slowing the reaction (in the reactor) or overheating the catalyst and deactivating it (in the regenerator) or causing undesirable side reactions (in the reactor).

The fluctuation in temperature of the heat exchange medium leaving the reactors also results in a variation in the amounts of heat available for generating steam, and it is also desirable to maintain the heat input into the steam generator as constant as possible.

Consequently, one object of the present invention is to provide a circuit for heat exchange fluid capable of operating efficiently under widely varying load conditions.

Another object is to provide for flexibility of operation while maintaining a high degree of efficiency and economy.

Still another object of this invention is to effect recovery of the energy incidental to cooling of the heat exchange medium at substantially constant rates.

Other objects will be apparent from the description which follows.

These and other objects of this invention are obtained by storing the heat transfer medium leaving the reactors in a hot accumulator and the medium leaving the waste heat steam generator in a cold accumulator, passing a controlled and relatively constant amount of fluid thru the waste heat boiler and balancing the proportion of fluid returned to the reactors from both hot and cold accumulators so as to maintain a constant temperature and constant rate of flow of the heat exchange medium being returned.

In the form of the invention illustrated in the drawing, 1 and 1a represent catalytic reactors provided with catalyst tubes 2 and 2a respectively, these reactors being so arranged as to permit continuous operation with one reactor on-stream while the other is in regeneration, the two reactors alternating in function.

Reactants, such as oil, to be cracked are fed to reactor 1 thru lines 3, 4 and 5 and to reactor 1a thru lines 3, 4a and 5a. The reaction products are removed from reactor 1 thru line 6 and from reactor 1a thru line 6a. Air for regenerating the catalyst is introduced into reactor 1 thru lines 7, 8 and 5 and to reactor 1a thru lines 7, 8a and 5a. The flue gases obtained by the combustion of the contaminants on the catalyst are removed from reactor 1 thru line 9 and from reactor 1a thru line 9a. A heat exchange medium, such as molten salt, is circulated in space 10 and 10a surrounding tubes 2 and 2a, respectively.

A waste heat boiler 22 is provided for the purpose of removing heat from the heat exchange medium being circulated. Accumulators 16 and 24 serve as storage for the heat transfer medium from the reactors and waste heat boiler respectively. Line 18 serves to recirculate medium from both accumulators.

One mode of operating this invention is as follows: Assuming that reactor 1 is being used for the on-stream portion of the cycle and that reactor 1a is being used simultaneously for the regeneration of the catalyst, the heat exchange medium is introduced in accordance with this invention into reactor 1 thru line 11 and is removed thru line 12, thence it is passed into line 13 and introduced into reactor 1a from which it is withdrawn thru line 14. From line 14 the molten heat exchange medium is passed thru line 15 and stored in hot accumulator 16 from which it may be recycled to the reactor by lines 17, 18 and 11.

When reactor 1a is on the on-stream portion of the cycle and the catalyst in reactor 1 is being regenerated, then the heat exchange medium is first introduced into reactor 1a thru lines 11a and 13 and is removed thru line 14 and conveyed by line 14a to line 11 where it is introduced into reactor 1. From reactor 1 the molten medium is removed thru line 12 and conveyed by lines 12a and 15 into hot accumulator 16. It may then be recycled to reactor 1a thru lines 17, 18, 11a and 13.

Thus, a manifolding system is provided whereby the heat exchange medium is always introduced first into the reactor which is on-stream and then into the reactor which is in regeneration. It is also possible by this arrangement to by-pass either one of the reactors if desired. For instance, the heat exchange medium may be introduced first into reactor 1 thru line 11 and from there may be conveyed directly to hot accumulator 16 by way of lines 12, 12a and 15, thus completely by-passing reactor 1a. Likewise, reactor 1 may be by-passed by introducing the salt into reactor 1a thru lines 11a and 13 and passing it directly to hot accumulator 16 by way of lines 14 and 15. Under certain conditions it may also be desired to pass the heat exchange medium thru the reactors in parallel. In this case, the medium is introduced into reactors 1 and 2 simultaneously thru lines 11 and 11a and removed thru lines 12a and 14 respectively.

It is also within the spirit of this invention to pass the heat exchange medium first thru the regenerator and then thru the reactor, but usually the heat control, when operating in this manner, is not as efficient as when first passing the heat exchange medium thru the reactor on-stream and then thru the reactor in regeneration.

The temperature of the heat exchange medium in the hot accumulator 16 is between 800° and 1000° F. and is eminently suitable for generating steam for use elsewhere in the plant. This is accomplished according to the present invention by continually withdrawing a controlled and relatively constant amount of the heat exchange medium in hot accumulator 16 thru line 19 and heat exchanger 20 where a portion of its heat is used, if desired, to preheat the air being used for regenerating the catalyst in reactors 1 and 1a. From the heat exchanger 20 the heat exchange medium is passed to the waste heat boiler 22 where further heat is extracted in producing steam for use in various plant operations. The rate of flow of heat exchange medium to the waste heat boiler may be controlled manually or automatically to hold the rate of steam production constant. From the waste heat boiler the heat exchange medium is passed thru line 23 to cold accumulator 24. From this accumulator the medium is passed thru line 25 to line 18 where it is recycled together with the heat exchange medium from accumulator 16.

To ensure that the rate of flow and heat input to the on-stream reactor are maintained constant, the medium being recycled to the reactors thru line 18 is composed of a mixture of the material in both hot and cold accumulators. By properly proportioning the amount of fluid from each of these accumulators, the temperature and rate of flow of the molten heat exchange medium being recycled to the reactors can be maintained constant. This is accomplished according to the present invention by providing in line 18 a temperature-sensitive device 26, such as a thermocouple, which operates thru control device 27 to open or close valve 28 when the temperature falls below or exceeds, respectively, a predetermined value. There is also provided in line 18 a flow sensitive device 29, such as a weir or orifice, which operates thru control device 30 to open or close valve 31 when the amount of material passing thru line 18 falls below or exceeds, respectively, a predetermined value. Thus, the temperature and flow control devices work in unison to control the temperature and the rate of flow of the combined fluid passing thru line 18.

During certain periods the temperature of the heat exchange medium in accumulator 16 increases due to variation in the intensity of the endothermic and exothermic reactions occurring in the reactors. When this happens, the opening in valve 28 is automatically reduced and the amount of material recycled thru line 18 from accumulator 16 is thus cut down. Accordingly, the flow sensitive device 29 then acts thru control 30 to open valve 31 wider and thus admit more material from the cold accumulator 24. Also the flow thru line 19, heat exchanger 20, line 21, waste heat boiler 22 and line 23 is slightly reduced by the manual or automatic control. Otherwise the steam production would increase due to the higher temperature at which the medium is now fed to the waste heat boiler. As a result of all the changes, the level in accumulator 16 is raised and that in accumulator 24 is lowered.

Similarly, during other periods, the temperature in accumulator 16 is lowered in response to fluctuations in the intensity of the reaction in the reactors, thus increasing the amount of fluid recycled from accumulator 16 thru line 18. This in turn operates to reduce the amount of fluid recycled from accumulator 24. Hence, the level in accumulator 16 is lowered and that in accumulator 24 is raised.

Thus, it is apparent from the above that the present invention provides a heat exchange system capable of operating smoothly and efficiently despite wide variations in momentary or periodic demands for heating or cooling capacity. It also provides for economical use of the contained heat in the heat exchange medium from the exothermic reactors where a closed circuit for the same is utilized without necessary wastage of such heat energy. It is also apparent that the invention provides a means for maintaining constant the temperature and rate of flow of the heat exchange medium recycled thru line 18 by varying the ratio of the amount of material from each of the two accumulators, and likewise provides a controlled and relatively-constant rate of flow, changing slightly with the slight change in temperature, on the fluid passing thru heat exchanger 20 and waste heat boiler 22 so as to ensure a constant steam production.

Among materials which may be used as heat exchange media in this invention may be mentioned fused salts or mixtures thereof, such as potassium nitrate, sodium nitrate, zinc chloride, or potassium chloride, and a mixture of potassium and sodium hydroxides. Likewise, fusible alloys, such as bismuth, lead, tin and cadmium may be used. Other materials, such as mercury, diphenyl and diphenyl oxide may also be employed.

Whereas only two reactors are shown in the drawing, it is within the scope of this invention to include as many reactors as desired. These may be arranged in any manner. For instance, the reactors in which the same type of reaction is occurring may be connected in parallel or in any other desirable manner, and the number of reactors carrying out each type of operation simultaneously need not be equal.

It is, of course, understood that modifications may be made to the invention. It is desired, therefore, that the invention be considered broadly as set forth in the description herein.

What is claimed is:

1. In controlling the temperature of a contact mass during regeneration by combustion to remove burnable deposits therefrom and involving the passage in heat exchange relation with the mass of a stream of temperature control liquid which is subject to a rise in temperature while absorbing heat from the regeneration reactions at rates which change progressively from above to below an average rate with progressive changes in the intensity of their combustion reactions, the process steps comprising storing a stream of fluid resulting from the said heat exchange in a first accumulator, continuously sending a controlled stream of fluid from said accumulator through a heat recovery zone, storing the fluid from said heat recovery zone in a second accumulator, continuously recycling to the reaction zone a stream of fluid from each of said accumulators, during the periods of above average reaction intensity reducing the rate at which fluid is recycled from the first accumulator and increasing the rate at which fluid is recycled from the second accumulator, and during periods of reduced reaction intensity increasing the rate at which fluid is recycled from the first accumulator and decreasing the rate at which fluid is recycled from the second accumulator.

2. In the temperature control of exothermic reactions which change in intensity above and below an average intensity involving the passage of temperature control fluid in heat exchange relation with the reaction zone to remove heat from the latter as a result of which the fluid rises in temperature in accordance with changes in reaction intensity, the process steps comprising storing a stream of fluid resulting from the said heat exchange in a first accumulator, continuously sending a controlled stream of fluid from said accumulator through a heat recovery zone, storing the fluid from said heat recovery zone in a second accumulator, continuously recycling to the reaction zone a stream of fluid from each of said accumulators, during the periods of above average reaction intensity reducing the rate at which fluid is recycled from the first accumulator, and increasing the rate at which fluid is recycled from the second accumulator, and during periods of reduced reaction intensity increasing the rate at which fluid is recycled from the first accumulator and decreasing the rate at which fluid is recycled from the second accumulator.

3. In controlling the temperature of chemical processes involving continuous passage of a stream of temperature control fluid in heat exchange relation with exothermic and endothermic reaction zones to impart heat or to remove heat from these zones, a portion of the stream as a result being subject to change of temperature in accordance with changes in reaction intensity, the process steps comprising storing the stream of fluid being removed from said exothermic reaction zones in a first accumulator, withdrawing a controlled portion of said stored material from said accumulator and passing it thru a heat recovering zone, storing the material from which heat has been extracted in a second accumulator, continuously recycling to the endothermic reaction zones a portion of the fluid in each of said accumulators, during periods of above average reaction intensity reducing the rate at which fluid is recycled from the first accumulator and increasing the rate at which fluid is recycled from the second accumulator, and during periods of reduced reaction intensity increasing the rate at which fluid is recycled from the first accumulator and decerasing the rate at which fluid is recycled from the second accumulator.

4. In a catalytic process using a plurality of reactors alternately on-stream and in regeneration wherein temperature control of the reactors is maintained by means of a circulating heat exchange medium and wherein the heat exchange medium is circulated first thru the endothermic reactors and then thru the exothermic reactors and is finally used to generate steam in a waste heat boiler, the improvement which comprises storing the heat exchange medium discharged from the exothermic reactors in a first accumulator, recycling a portion of the thus stored heat exchange medium directly to the endothermic reactors, continually passing another controlled portion of the stored heat exchange medium to a waste heat boiler, storing the heat exchange medium discharged from the waste heat boiler in a second accumulator, and maintaining constant the temperature and rate of flow of the heat exchange medium being introduced into the endothermic reactors by proportioning the amount of heat exchange medium recycled from each accumulator according to the temperatures of the heat exchange medium in the accumulators.

5. In a catalytic process using a plurality of reactors alternately on-stream and in regeneration wherein the temperature control of the reactors is maintained by means of a circulating heat exchange medium and wherein the heat exchange medium is circulated first through the endothermic reactors and then through the exothermic reactors and is finally used to generate steam in a waste heat boiler, the method of maintaining constant the generation of steam in the waste heat boiler which comprises storing the heat exchange medium discharged from the exothermic reactors in a first accumulator, continually passing a controlled and relatively constant portion of the heat exchange medium from the said first accumulator through the said waste heat boiler and storing it in a second accumulator, withdrawing a variable portion of the heat exchange medium stored in said second accumulator and mixing it with a variable portion of said heat exchange medium withdrawn from said first accumulator and recycling said mixed portions to said reactors to control the temperature therein.

DONALD L. CAMPBELL.
HOMER Z. MARTIN.